United States Patent
Kondo et al.

(10) Patent No.: US 8,033,004 B2
(45) Date of Patent: Oct. 11, 2011

(54) METHOD FOR INSTALLING RUN CHANNEL FOR AUTOMOBILE

(75) Inventors: Toshiyuki Kondo, Tochigi (JP); Saeko Komatsu, Tochigi (JP); Hiroaki Sakamoto, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 1155 days.

(21) Appl. No.: 11/719,815

(22) PCT Filed: Nov. 22, 2005

(86) PCT No.: PCT/JP2005/021404
§ 371 (c)(1),
(2), (4) Date: Jun. 12, 2007

(87) PCT Pub. No.: WO2006/054764
PCT Pub. Date: May 26, 2006

(65) Prior Publication Data
US 2009/0139070 A1    Jun. 4, 2009

(30) Foreign Application Priority Data

Nov. 22, 2004  (JP) .................................. 2004-337655
Nov. 22, 2004  (JP) .................................. 2004-337677

(51) Int. Cl.
*B23P 11/02* (2006.01)
(52) U.S. Cl. ............... 29/451; 29/235; 29/428; 29/450; 29/525; 29/559; 29/700
(58) Field of Classification Search ............ 29/428, 29/700, 235, 525, 559, 451, 450
See application file for complete search history.

(56) References Cited

U.S. PATENT DOCUMENTS

| 4,715,110 | A | | 12/1987 | St. Angelo et al. |
| 5,179,774 | A | * | 1/1993 | Massie ............................ 29/451 |
| 5,875,670 | A | | 3/1999 | Stojkovski et al. |

FOREIGN PATENT DOCUMENTS

| CA | 1275430 | 10/1990 |
| CA | 2211611 | 1/1998 |
| EP | 0253599 | 1/1988 |
| EP | 0822019 | 2/1998 |
| JP | 05-200638 | 8/1993 |
| JP | 5-65298 | 9/1993 |
| JP | 08-155843 | 6/1996 |
| JP | 08-174353 | 7/1996 |
| JP | 10-166280 | 6/1998 |
| JP | 2002-205551 | 7/2002 |
| WO | 01/74541 | 10/2001 |

* cited by examiner

*Primary Examiner* — Richard Chang
(74) *Attorney, Agent, or Firm* — Rankin, Hill & Clark LLP

(57) ABSTRACT

An automobile run channel installing method for installing a run channel in a sash of an automobile door is provided. The method involves setting a run channel to a conveyance device having only a pair of arms, the run channel having a concave section and only two corner sections; pushing both corner sections of the run channel into corner sections of an upper portion of the sash, respectively; pressing and fitting an upper-sash roller of the arm into the concave section of the run channel to move from the corner section of the upper sash; and pressing and fitting a lower-sash roller of the arm into the concave section of the run channel to move from a higher portion to a lower portion of a lower portion of the sash and to fit the run channel into the lower sash.

3 Claims, 9 Drawing Sheets

(a)

(b)

(a)  (b)

(a)     (b)

METHOD FOR INSTALLING RUN CHANNEL FOR AUTOMOBILE

TECHNICAL FIELD

The present invention relates to an automobile run channel installing method for installing a run channel for an automobile on a sash of an automobile door, a device for installing a run channel for an automobile, and a soft member installation device for installing a soft member such as a run channel for an automobile door. The automobile door is shaped substantially concave in section and the soft member is installed in a concave groove of a member, substantially concave in section, such as a sash of an automobile door.

BACKGROUND ART

Conventionally, as a method for installing a run channel for an automobile door on a concave groove of sash of an automobile door, there is known a method for installing a run channel for an automobile door in a spatula section first with a seal rubber fitting jig composed of a spatula section formed in one end of a rod-like section bent to an L-shape, a pressing protruding section formed in a base of the spatula section and a pressing and fitting roll provided in the other end of the rod-like section; subsequently fitting the spatula section into a corner section of the sash of an automobile door; and moreover fitting the run channel for an automobile door into a concave groove of the sash of an automobile door with the pressing protruding section and the pressing and fitting roll (see Patent Literature 1, for example).

Patent Literature 1: Japanese Patent Application Publication No. 2002-205551

However, the method for installing a run channel for an automobile door disclosed in Patent Literature 1 has a problem in that it does not contribute to man-hour reduction since a worker uses a seal rubber fitting jig to install a run channel for an automobile door in a concave groove of a sash of an automobile door.

The present invention has been made in view of the problem that methods of the prior art have and provides a versatile method for installing a run channel for an automobile door which is capable of man-hour reduction and applicable to multiple models, a device for installing a run channel for an automobile, and a soft member installation device.

DISCLOSURE OF THE INVENTION

In order to solve the above described problem, according to an aspect of the present invention, there is provided an automobile run channel installing method for installing a run channel on a sash of an automobile door, comprising the steps of setting a run channel to a conveyance means having a pair of arms, inserting both end sections of the run channel set to the pair of arms from a gap formed by an inner panel and an outer panel in a downward directed state into an automobile door and positioning the run channel along a sash, pushing both corner sections of the run channel set to the pair of arms into a corner section of an upper sash, pressing and fitting an upper-sash roller attached to at least one of the arms into a concave section of the run channel to move from the corner section of the upper sash so as to fit the run channel into the upper sash, and pressing and fitting the lower-sash roller attached to the arm and inserted into the automobile door from the gap into a concave section of the run channel to move from a higher portion to a lower portion of the lower sash and to fit the run channel into the lower sash.

According to another aspect of the present invention, there is provided an automobile run channel installation device for installing a run channel on a sash of an automobile door, comprising a conveyance means having a pair of arms which operate in a coordinated manner and a run channel installation jig provided on each of the arms, wherein the run channel installation jig has a first holding means for holding both corner sections of the run channel, a pressing means for pressing and fitting both corner sections of the run channel held by the first holding means into a corner section of an upper sash, a rotatable upper-sash roller for pressing and fitting the run channel into the upper sash, a second holding means for holding both end sections of the run channel, a rotatable lower-sash roller for pressing and fitting the run channel into the lower sash, and a slide means for arbitrarily setting a distance of the second holding means and the lower-sash roller relative to the first holding means.

According to another aspect of the present invention, there is provided a soft member installation device for installing a soft member having a long groove and a substantially concave sectional shape in a concave groove of a long member and presenting a substantially concave shape in section, comprising a supporting member made of an elastic member having a thin plate shape in section, a roller rotatably installed in a shaft member provided perpendicularly to a tip surface of the supporting member and capable of being freely inserted into the groove of the soft member, and a control means for controlling a posture of the supporting member freely to enable the soft member to be installed in the concave groove of the member to be installed with operations of the roller.

According to the present invention, a run channel for an automobile door being a long soft object can be installed accurately and automatically in a sash of an automobile door. In addition, improvement and stabilization in quality of installation of a run channel for an automobile door can be attained.

Also, according to the present invention, with an operation of a roller with deflection of a supporting member, a soft member such as a run channel for an automobile door being a long soft object can be installed accurately and automatically in a concave groove present in a substantially concave member in section such as a sash of an automobile door without causing control means to bear a large burden. In addition, improvement and stabilization in quality of installation of a soft member such as a run channel for an automobile door in a concave groove can be attained.

BEST MODE FOR CARRYING OUT THE INVENTION

Figure 2:
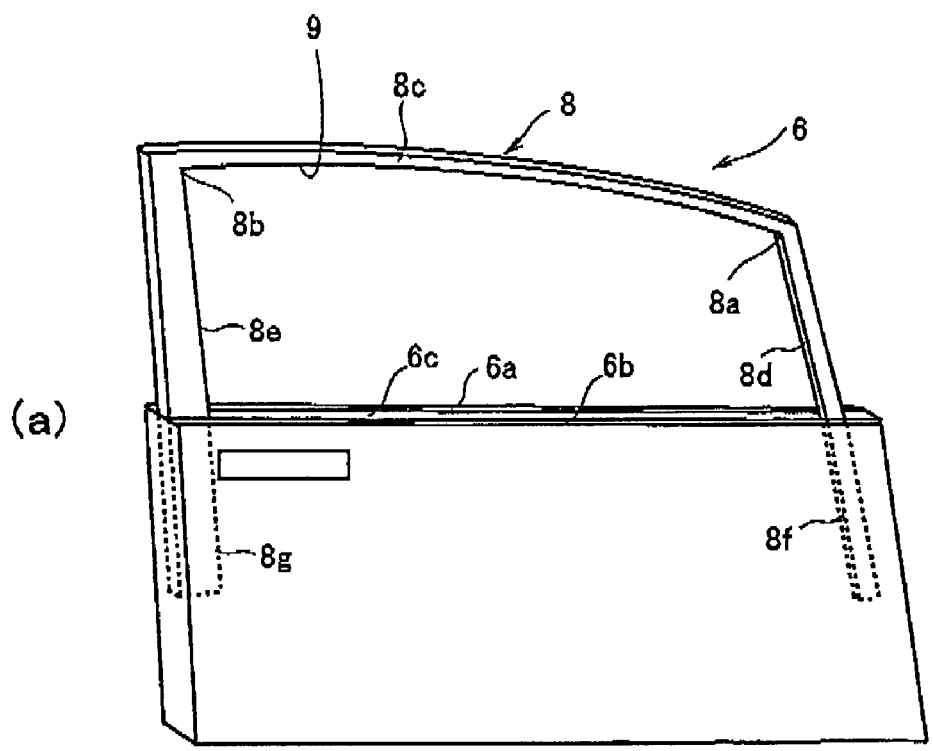
FIG. 2(a) is a perspective view of an automobile door and FIG. 2(b) is a section view of a run channel for an automobile door.
Figure 2:
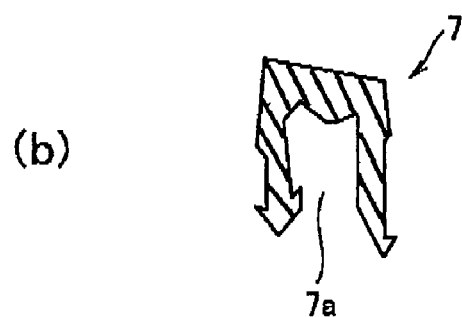
Figure 3:
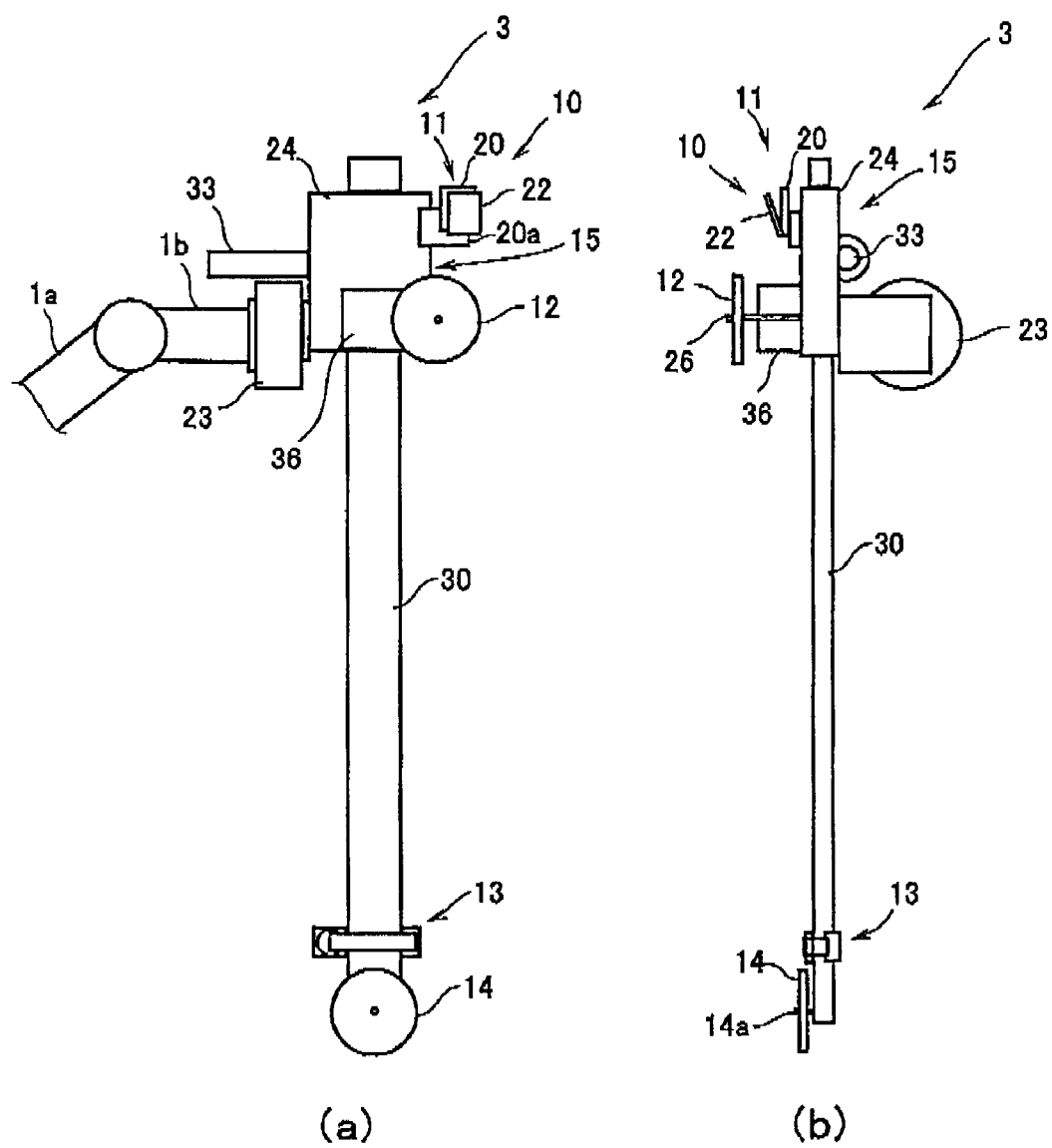
FIG. 3 are Schematic diagrams of a run channel installation jig, (a) being a front view and (b) being a side view.
Figure 4:
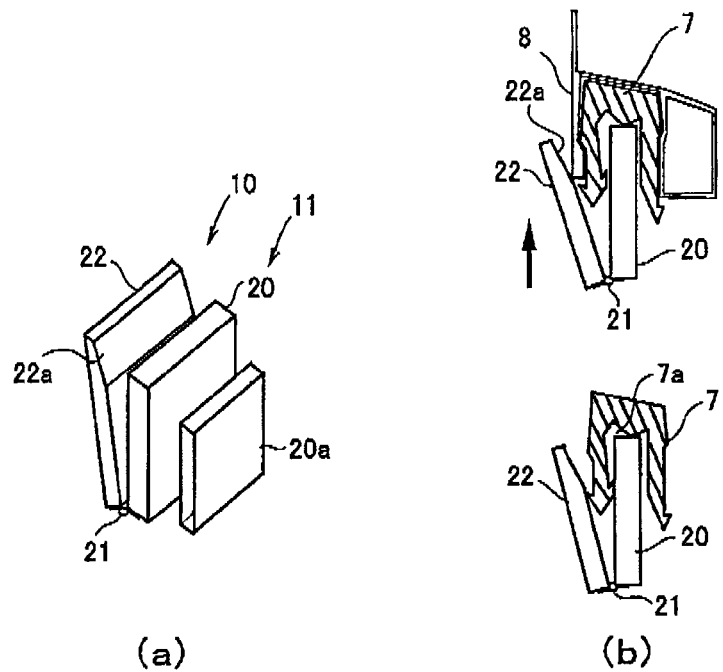
FIG. 4 are schematic diagrams of a first holding means and pressing means, (a) being a perspective view and (b) being diagrams for describing operations.
Figure 5:
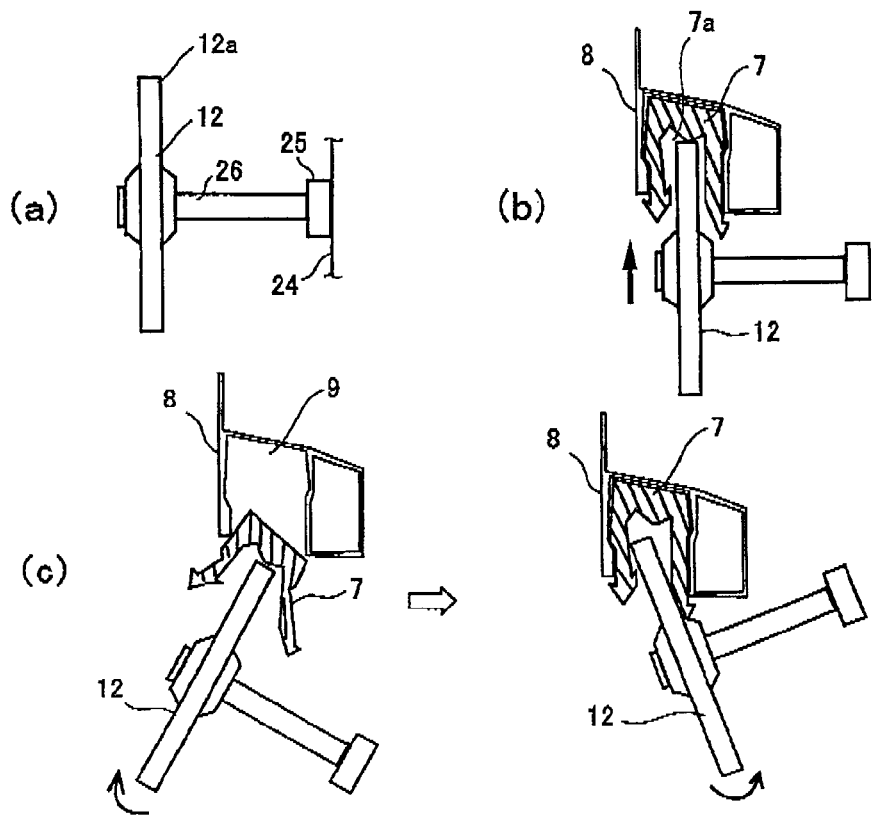
FIG. 5 are schematic diagrams of an upper-sash roller, (a) being a side view and (b) and (c) being diagrams for describing operations.
Figure 6:
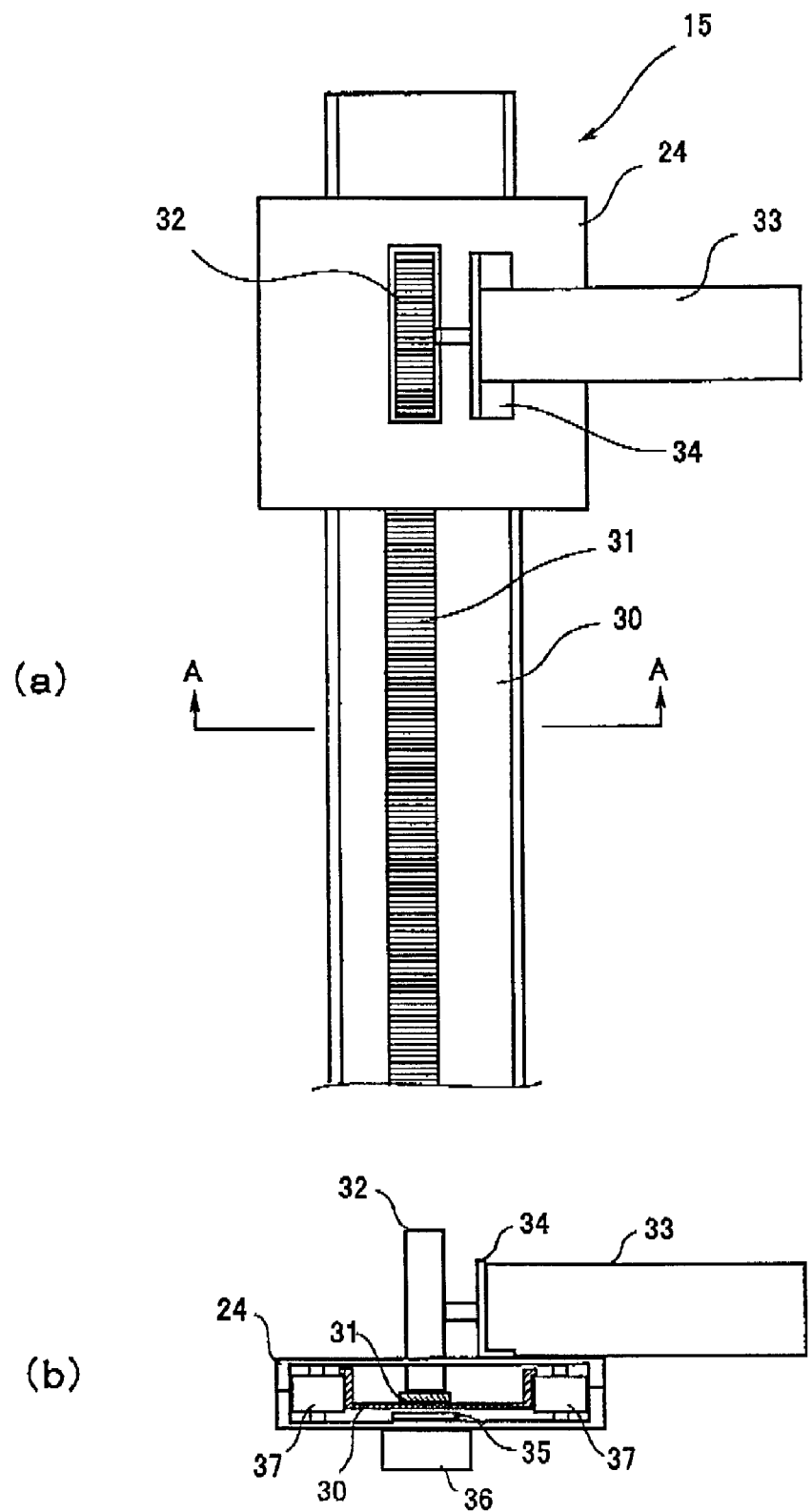
FIG. 6 are schematic diagrams of a slide means, (a) being a front view and (b) being a section of Figure (a) viewed along an A-A line in the direction indicated by arrows.
Figure 7:
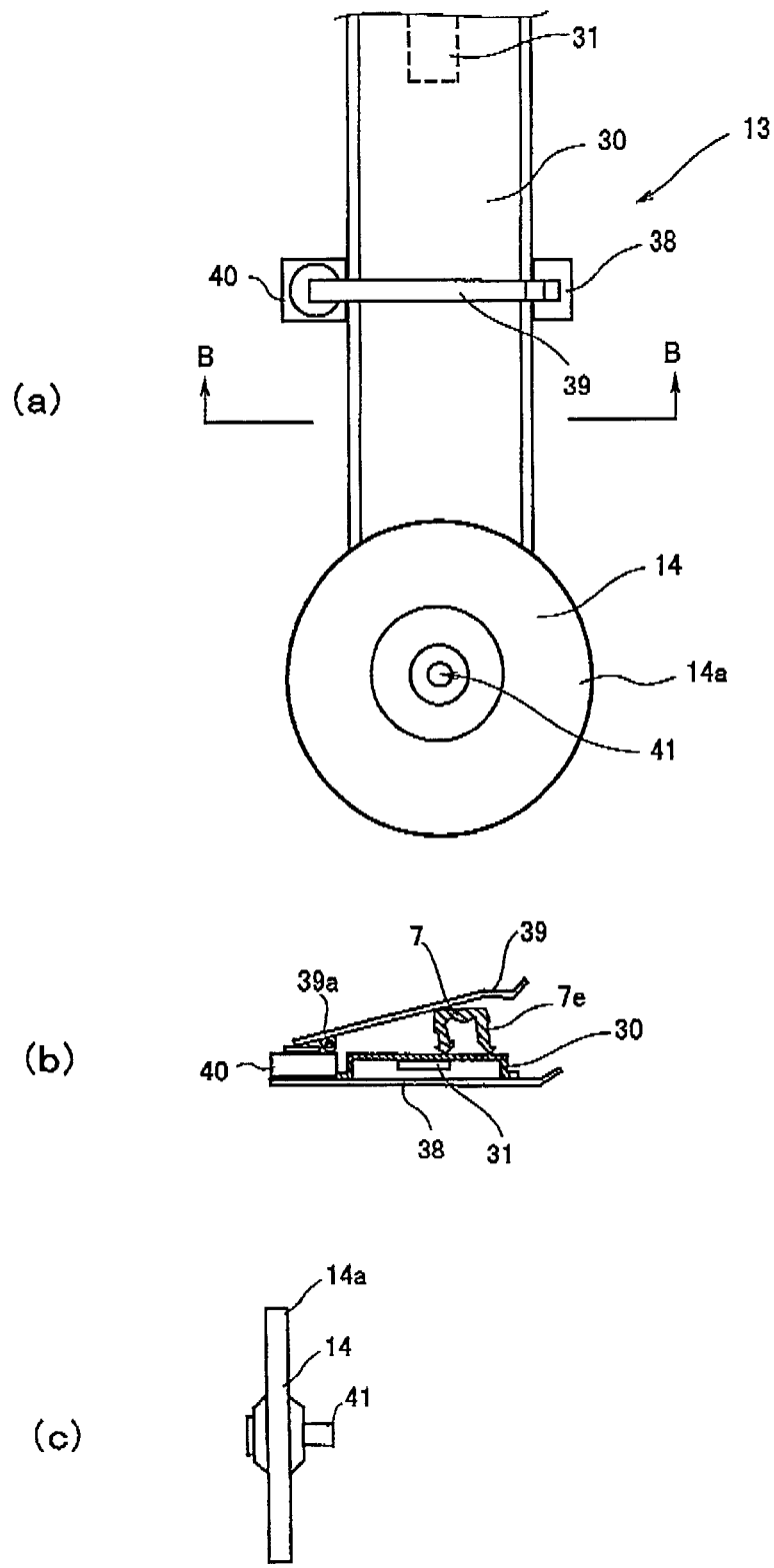
FIG. 7 are schematic diagrams of a second holding means and a lower-sash roller, (a) being a front view, (b) being a section of Figure (a) viewed along an B-B line in the direction indicated by arrows and (c) being a side view of a lower-sash roller.
Figure 8:
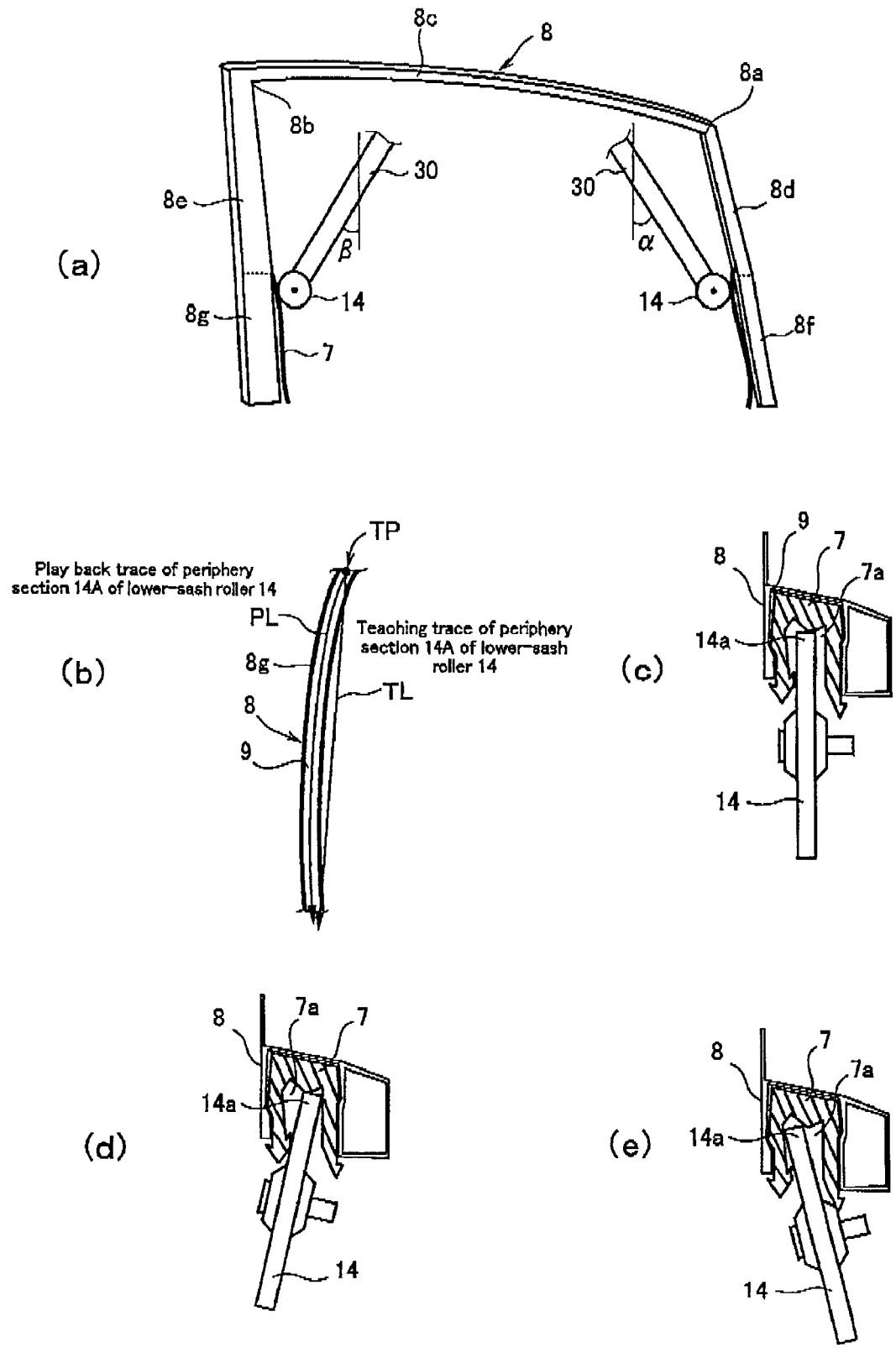
FIG. 8 are diagrams for describing operations of a lower-sash roller and a slide rail, (a) being a diagram for describing operations of a slide rail; (b) being a diagram for describing a teaching and play back trace of a lower-sash roller; and (c), (d) and (e) being diagrams for describing operations of a lower-sash roller.

Embodiments of the present invention will be described with reference to the accompanying drawings below. Here, FIG. 1 is a schematic explanatory diagram of a run channel installation device for an automobile, FIG. 2 illustrate perspective views (a) of an automobile door and a sectional view and (b) of a run channel for an automobile door, FIG. 3 are schematic diagrams of a run channel installation jig, FIG. 4 are schematic diagrams of a first holding means and pressing means, FIG. 5 are schematic diagrams of an upper-sash roller, FIG. 6 are schematic diagrams of a slide means, FIG. 7 are schematic diagrams of second holding means and a lower-sash roller, and FIG. 8 are diagrams for describing operations of a lower-sash roller and a slide rail.

Figure 1:
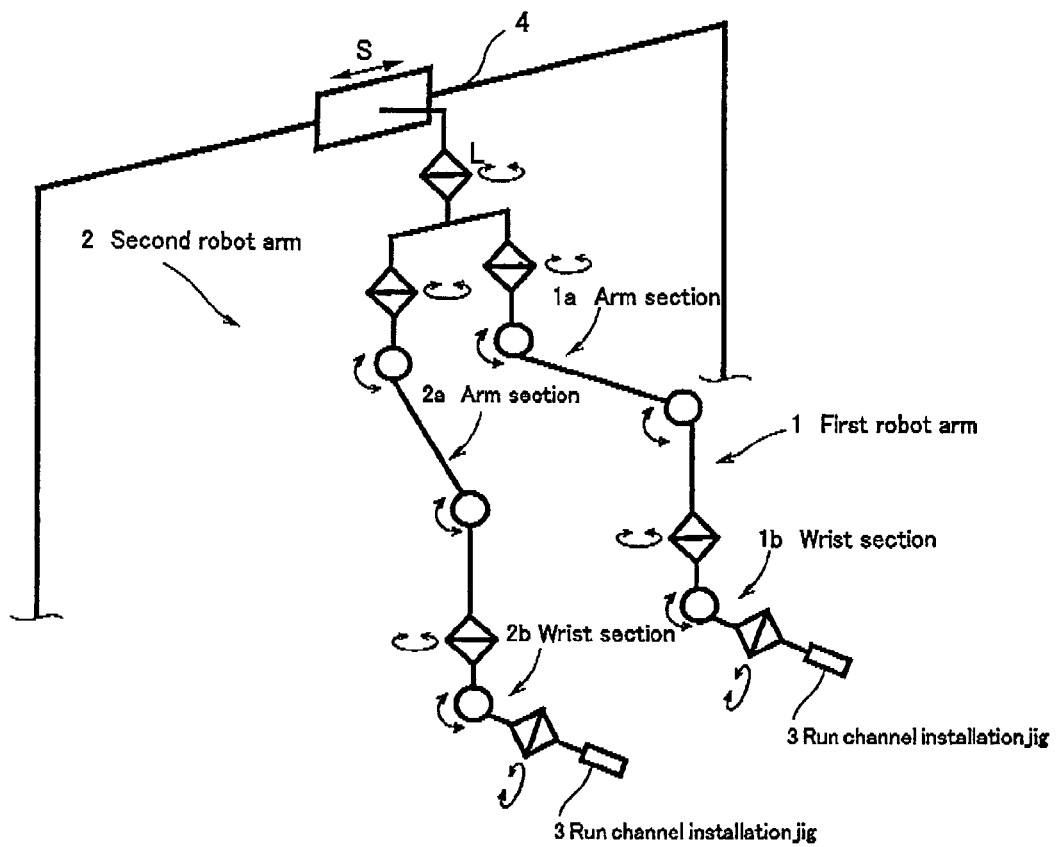
FIG. 1 is a schematic explanatory diagram of a run channel installation device for an automobile.

A device for installing a run channel for an automobile door related to the present invention comprises, as illustrated in FIG. 1, a first robot arm 1 and a second robot arm 2, the robot arms 1, 2 being a pair of robot arms with multiple joints which operate in a coordinated manner, and run channel installation jigs 3 respectively provided in the tips of the first robot arm 1 and the second robot arm 2.

The first robot arm 1 and the second robot arm 2 are respectively composed of arm sections 1a and 2a with three axes (three degrees of freedom) and wrist sections 1b and 2b with three axes (three degrees of freedom) provided at the tips of the arm sections 1a and 2a and are both installed in a base 5 with a gate-form frame 4 being a running shaft S. Run channel installation jigs 3 are attached to the wrist sections 1b and 2b. Here, the base 5 has a pivot L between the running shaft S and the robot arms 1 and 2.

Therefore, the present device has 14 axes (14 degrees of freedom) in total. The operation for installing a run channel for an automobile door with the first robot arm 1 and the second robot arm 2 is taught and played back with a control device (not illustrated in the drawing).

In addition, as illustrated in FIG. 2(a), an automobile door (right side front door) 6 is configured by an inner panel 6a, an outer panel 6b and an automobile door sash 8 as a substantially concave member in section where an automobile door run channel (herein after to be referred to as "run channel") 7 is installed. A concave section 7a is formed in the run channel 7 as illustrated in FIG. 2(b). The inner panel 6a and the outer panel 6b form a gap 6c.

An automobile door sash 8 has a front corner section 8a and a rear corner section 8b and includes: an upper section 8c from the front corner section 8a to the rear corner section 8b; an upper front section 8d approximately perpendicular to the front corner section 8a; an upper rear section 8e approximately perpendicular to the rear corner section 8b; a lower front section 8f in succession to the upper front section 8d and covered by the inner panel 6a and the outer panel 6b; and a lower rear section 8g in succession to the upper rear section 8e and covered by the inner panel 6a and the outer panel 6b, respectively having a concave groove 9. Here, the upper section 8c, the upper front section 8d and the upper rear section 8e are called upper sashes. The lower front section 8f and the lower rear section 8g are called lower sashes.

As illustrated in FIG. 3, a run channel installation jig 3 has a first holding means 10 for holding both corner sections 7b and 7c of the run channel 7, a pressing means 11 for pressing and fitting both corner sections 7b and 7c of the run channel 7 held by the first holding means 10 into corner sections 8a and 8b of an upper sash, a rotatable upper-sash roller 12 pressing and fitting the run channel 7 into the upper sash, a second holding means 13 for holding both end sections 7d and 7e of the run channel 7, a rotatable lower-sash roller 14 for pressing and fitting the run channel 7 into a lower sash, and a slide means 15 for arbitrarily setting the distance of the second holding means 13 and the lower-sash roller 14 relative to the first holding means 10. Here, FIG. 3 illustrate a run channel installation jig 3 installed in the tip of the second robot arm 2.

The first holding means 10 has, as illustrated in FIG. 4(a), a nail member 20 with thickness enabling insertion into the concave section 7a of the run channel 7 and an opening and closing member 22 formed capable of freely opening and closing with a hinge 21 provided in the nail member 20 and a spring (not illustrated in the drawing) for sandwiching the run channel 7 with the spring power together with the nail member 20 inserted into the concave section 7a. As illustrated in FIG. 3, the nail member 20 is fixed to a guide member 24 through an installation bracket 20a. The guide member 24 is installed on installation surfaces of the wrist sections 1b and 2b through a force sensor 23.

As illustrated in FIG. 4(b), in the tip section of the opening and closing member 22, a tapered section 22a is formed for enabling the nail member 20 to press the run channel 7 when holding the run channel 7, and thereby causing the run channel 7 to widen the gap formed by the nail member 20 and the opening and closing member 22 so as to be allowed to enter the spacing between them. In addition, the tapered section 22a plays a role of supporting the corner section of the sash 8 to press the opening and closing member 22 so that the first holding means 10 smoothly comes into an open state also when both corner sections 7b and 7c of the run channel 7 held by the first holding means 10 are inserted into the sash 8.

In order to cause the first holding means 10 to hold both corner sections 7b and 7c of the run channel 7, the nail member 20 is preferably covered by the concave section 7a of the run channel 7. Then, the run channel 7 fits to the nail member 20 in the concave section 7a thereof and is held by the nail member 20 and the opening and closing member 22 with the spring force. In addition, in order to fit both corner sections 7b and 7c of the run channel 7 into the corner sections 8a and 8b of the sash 8, the nail member 20 is preferably removed from the run channel 7 after pushing both corner sections 7b and 7c of the run channel 7 into the corner sections 8a and 8b of the sash 8 with the nail member 20.

The pressing means 11 completes its function when the nail member 20 is inserted into the concave section 7a of the run channel 7 and thereby pressed and fitted into the corner sections 8a and 8b of the upper sash.

As illustrated in FIG. 5(a), the upper-sash roller 12 is rotatably installed in a shaft member 26 provided in the guide member 24 through the bracket 25. Here, the shaft member 26 is provided approximately in the center of the installation surface of the wrist sections 1b and 2b and approximately perpendicular to the installation surface. In addition, a periphery section 12a of the upper-sash roller 12 is formed to provide thickness for allowing insertion into the concave section 7a of the run channel 7.

The upper-sash roller 12 can ensure installation of the run channel 7 in the automobile door sash 8 by pushing and inserting the periphery section 12a into the concave section 7a of the run channel 7 and sliding and rotating the periphery section 12a to move. Here, as illustrated in FIG. 5(b), in the case of the run channel 7 being hardly deformable in shape, an operation with a single degree of freedom of only pushing and fitting with the upper-sash roller 12 enables installation of the run channel 7 in the automobile door sash 8.

However, in the case of the run channel 7 being easily deformable in shape, an operation with two degrees of freedom or three degrees of freedom, such as twisting and fitting with the upper-sash roller 12, presses and fits the run channel 7 into the automobile door sash 8 as illustrated in FIG. 5(c) and thereby enables installation of the run channel 7 in the automobile door sash 8.

As illustrated in FIG. 6(a), a slide means 15 has a guide member 24; a slide rail 30 made of an elastic member having a thin plate shape and being substantially U-shaped in section slidably fits into the guide member 24; a rack 31 laid across the slide rail 30; a pinion 32 meshing with the rack 31; a servomotor 33 with the pinion 32 fixed to a rotary shaft; and a control section (not illustrated in the drawing) having a position detector, motor drive circuit and the like, for driving the servomotor 33 to control a protruding amount of the slide rail 30. The servomotor 33 is provided in a fixed manner in the guide member 24 through the bracket 34.

In addition, as illustrated in FIG. 6(b), the slide means 15 is provided with a pad 35 for pressing the surface of the slide rail 30, where the rack 31 is laid, on the opposite side in order to restrain shrinkage of the slide rail 30 due to a load in the case where the servomotor 33 is in a halt state; and a cylinder 36 providing the pad 35 with a desired pressing force. The cylinder 36 is provided in a fixed manner in the guide member 24 thorough the bracket (not illustrated in the drawing). Here, a bearing 37 smoothes protruding operation of the slide rail 30.

As illustrated in FIGS. 7(a) and 7(b), the second holding means 13 has a plate member 38 provided in the vicinity of the tip of the slide rail 30; an opening and closing member 39 for sandwiching both end sections 7d and 7e of the run channel 7 together with the plate member 38; and a cylinder 40 providing the opening and closing member 39 with a holding force. A shaft pin 39a rotates the opening and closing member 39. The forward and backward movement of the cylinder 40 enables the opening and closing member 39 to open and close. Here, the run channel 7 is omitted from illustration in FIG. 7(a).

As illustrated in FIG. 7(b), in order to hold both end sections 7d and 7e of the run channel 7 with the second holding means 13, it is preferable to cause the cylinder 40 to retreat to open the opening and closing member 39; to carry out positioning both end sections 7d and 7e between the slide rail 30 and the opening and closing member 39; to cause the cylinder 40 to move forward; and to close the opening and closing member 39. Then, the run channel 7 is held by the plate member 38 and the opening and closing member 22 with a pressing force of the cylinder 40.

As illustrated in FIG. 7(a), the lower-sash roller 14 is installed rotatably in a shaft member 41 provided perpendicularly to the tip surface of the slide rail 30 made of an elastic member. The shaft member 41 is arranged approximately in parallel to the shaft member 26 of the upper-sash roller 12. In addition, as illustrated in FIG. 7(c), a periphery section 14a of the lower-sash roller 14 is formed to provide thickness for allowing insertion into the concave section 7a.

In the case of pushing the run channel 7 into the concave groove 9 of a lower front section 8f and a lower rear section 8g with the lower-sash roller 14, the slide rail 30 is, as illustrated in FIG. 8(a), inclined by predetermined angles $\alpha$ and $\beta$ with respect to the perpendicular direction. As illustrated in FIGS. 8(b) and (c), the lower-sash roller 14 installed in the tip of the slide rail 30 inclined by the predetermined angles $\alpha$ and $\beta$ takes the state of pushing the concave groove 9 of the upper end of the lower front section 8f and the lower rear section 8g through the run channel 7 as a teaching point TP and teaches the periphery section 14a of the lower-sash roller 14 to move from that teaching point TP on a line TL from a higher portion to a lower portion along each of the shapes of the lower front section 8f and the lower rear section 8g. Here, FIG. 8(b) depicts the lower rear section 8g and the run channel 7 is not illustrated in the drawing.

Subject to such teaching, the lower-sash roller 14 installed in the tip of the slide rail 30 made of an elastic member maintains, as illustrated in FIGS. 8(d) and (e), the state of fitting into the concave groove 9 of the lower front section 8f and the lower rear section 8g forming a curved shape slightly curved in the right and left directions through the run channel 7, carries out complicated operations and moves along a curve PL with deflection of the slide rail 30 and a reaction force from the lower front section 8f and the lower rear section 8g during play back. Then, the run channel 7 is smoothly fitted into the concave groove 9 in a substantially concave shape in section of the lower front section 8f and the lower rear section 8g.

Thus, by utilizing deflection of the slide rail 30 and a reaction force from the lower front section 8f and the lower rear section 8g provided by the lower-sash roller 14 fitting into the concave groove 9 through the run channel 7, even if a curved shape is present in the lower front section 8f and the lower rear section 8g more or less, as illustrated in FIG. 8(b), the moving operation on the line TL along the shape of the lower front section 8f and the lower rear section 8g is preferably taught to the lower-sash roller 14 and there is no necessity for teaching of moving operations along the curved shape of the lower front section 8f and the lower rear section 8g. Therefore, it is possible to simplify teaching operations of the first robot arm 1 and the second robot arm 2.

A soft member installation device related to the present invention is configured by a lower-sash roller 14; a slide rail 30 for supporting the lower-sash roller 14; a first robot arm 1 and a second robot arm 2 for controlling the posture of the slide rail 30 freely so that the operation of the lower-sash roller 14 enables installation of the run channel 7 in the concave groove 9 of the lower front section 8f and the lower rear section 8g of the sash 8.

Figure 9:
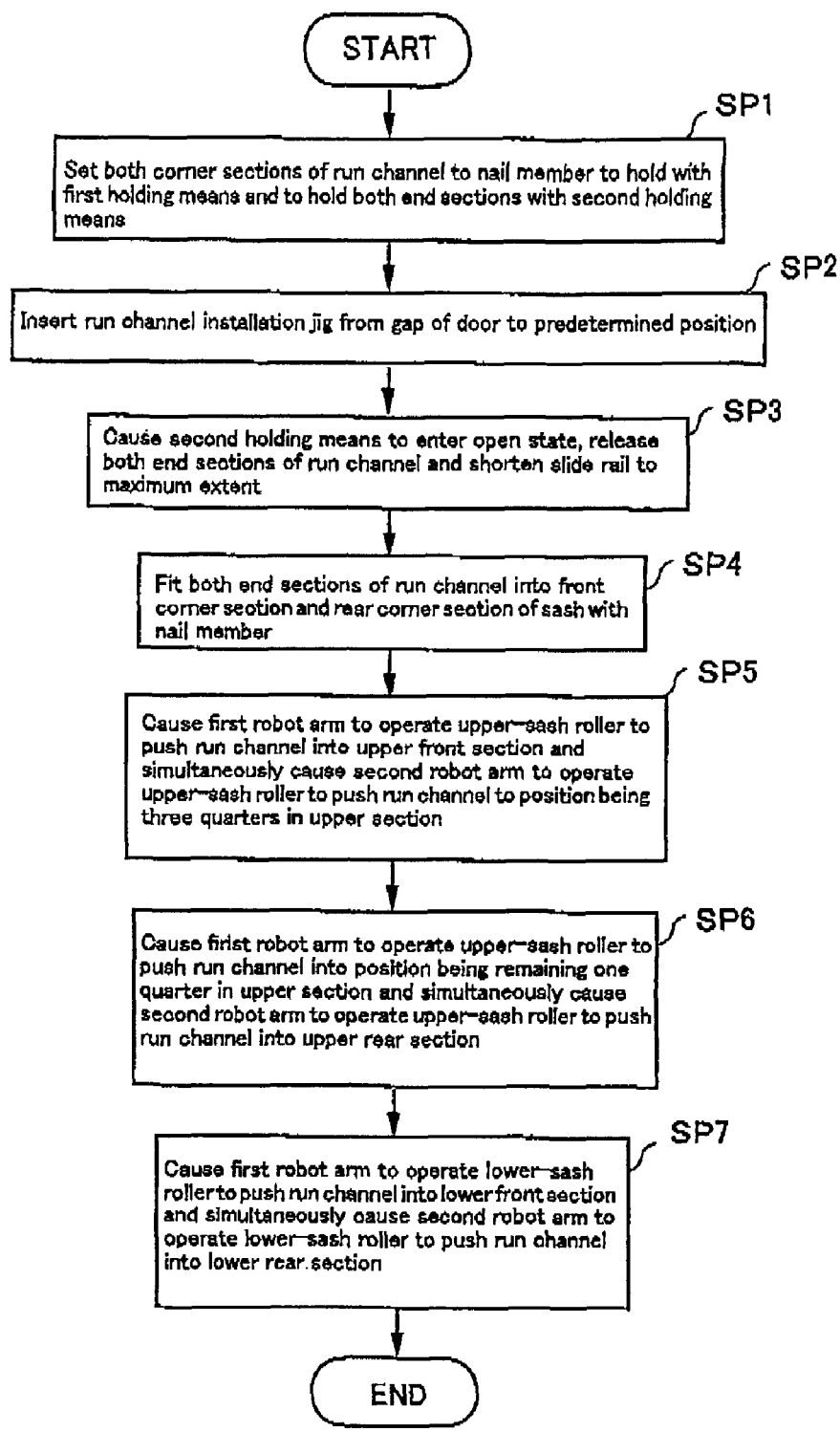
FIG. 9 is a flow chart illustrating a run channel installation operation procedure.
Figure 10:
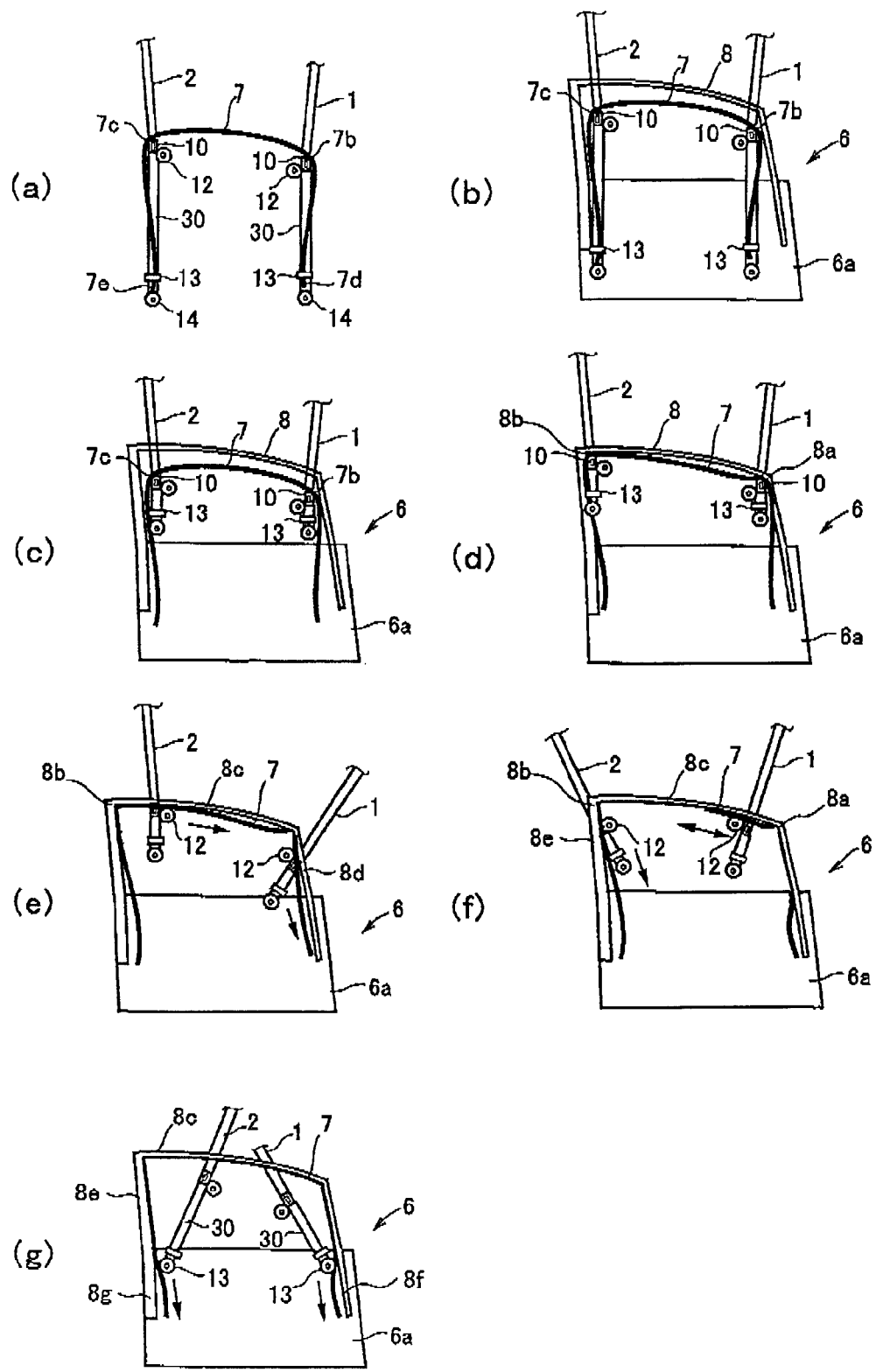
FIG. 10 are explanatory diagrams illustrating the run channel installation operation procedure, (a) being an operation for setting a run channel in a robot arm; (b) being an operation of inserting a run channel into a door gap; (c) being an operation for opening a second holding means and a retreat operation of a slide rail; (d) being an operation for fitting both corner sections of the run channel into corner sections of a sash; and (e), (f) and (g) being an operation of fitting a run channel into a sash of an automobile door with a robot arm.

Next, a method for installing a run channel for an automobile door related to the present invention and the operations of a device for installing a run channel for an automobile door and the operations of a soft member installation device related to the present invention will be described with reference to the flow chart illustrating a run channel installation operation procedure in FIG. 9 and the explanatory diagrams illustrating run channel installation operation procedure in FIG. 10. Here, the outer panel 6b is omitted from illustration in FIG. 10.

At first, as illustrated in FIG. 10(a), in step SP1, an operator makes the first holding means 10 and the second holding means 13 respectively installed in the first robot arm 1 and the second robot arm 2 that are ready in the original positions and are taught a program for the run channel installing operations in advance hold both corner sections 7b and 7c and both end sections 7d and 7e of the run channel 7 where a loosen is coated.

At that occasion, a slide rail 30 is extended to a maximum extent. In addition, the length of the run channel 7 from the nail member 20 of the first robot arm 1 to the nail member 20 of the second robot arm 2 is approximately equal to the length of the upper section 8c from the front corner section 8a to the rear corner section 8b in the automobile door sash 8.

Next, in step SP2, when a startup switch is pressed, the first robot arm 1 and the second robot arm 2 start playing back the program of the run channel installing operation. Then, as illustrated in FIG. 10(b), the first robot arm 1 and the second robot arm 2 are driven. The lower-sash roller 14 and the second holding means 13 of the run channel installing jig 3 installed in the first robot arm 1 are inserted from a gap (approximately 25 mm in width) 6c formed by the inner panel 6a and the outer panel 6b opening in the vicinity of the root (for example, 10 cm from the root) of the automobile door sash 8 (upper front section 8d).

Likewise, the lower-sash roller 14 and the second holding means 13 of the run channel installing jig 3 installed in the second robot arm 2 are also inserted from a gap (approximately 25 mm in width) 6c formed by the inner panel 6a and the outer panel 6b opening in the vicinity of the root (for example, 10 cm from the root) of the automobile door sash 8 (upper rear section 8e).

Moreover, the lower-sash roller 14 and the second holding means 13 provided in the tip of the slide rail 30 extended to the maximum extent are inserted to reach a predetermined position without interrupting the inner panel 6a, the outer panel 6b and the like.

Subsequently, in step SP3, the second holding means 13 is opened to release both end sections 7d and 7e of the run channel 7. Moreover, as illustrated in FIG. 10(c), in order to release the lower-sash roller 14 from the gap 6c formed by the inner panel 6a and the outer panel 6b, the slide rail 30 is shortened to the maximum extent.

Then, the lower-sash roller 14 and the second holding means 13 escape from the gap 6c formed by the inner panel 6a and the outer panel 6b. On the other hand, both end sections 7d and 7e of the run channel 7 will be hung between the inner panel 6a and the outer panel 6b.

Subsequently, as illustrated in FIG. 10(d), in step SP4, the first robot arm 1 and the second robot arm 2 are driven. The corner section 7b of the run channel 7 where the nail member 20 of the first robot arm 1 is inserted is fit into the front corner section 8a of the sash 8. The corner section 7c of the run channel 7 where the nail member 20 of the second robot arm 2 is inserted is fit into the rear corner section 8b of the sash 8.

At the time when the respective nail members 20 press and fit the run channel 7 into the respective corner sections 8a and 8b of the sash 8, as illustrated in FIG. 4(b), the tapered section 22a of the opening and closing member 22 will enter an open state against the spring force with the corners of the corner sections 8a and 8b. Therefore the first holding means 10 will automatically enter an open state.

Subsequently, in step SP5, as illustrated in FIG. 10(e), in order to sequentially fit the run channel 7 from the upper front section 8d in the vicinity of the front corner section 8a, the first robot arm 1 causes the upper-sash roller 12, which presses and fits the periphery section 12a into the concave section 7a in the vicinity of the front corner section 8a, to slide and rotate to move to the lower end of the upper front section 8d.

On the other hand, in order to sequentially fit the run channel 7 from the upper section 8c in the vicinity of the rear corner section 8b, the second robot arm 2 causes the upper-sash roller 12, which presses and fits the periphery section 12a into the concave section 7a in the vicinity of the rear corner section 8b, to slide and rotate to move to the position three quarters along the upper section 8c, closer to the front corner section 8a.

Subsequently, in step SP6, as illustrated in FIG. 10(f), in order to push the run channel 7 into the portion of the remaining one quarter of the upper section 8c, the first robot arm 1 causes the upper-sash roller 12, which presses and fits the periphery section 12a into the concave section 7a in the vicinity of the front corner section 8a, to slide and rotate to move in a reciprocated manner in the distance of approximately two-thirds of the upper section 8c from the front corner section 8a toward the rear corner section 8b.

On the other hand, in order to sequentially push the run channel 7 from the upper rear section 8e in the vicinity of the rear corner section 8b, the second robot arm 2 causes the upper-sash roller 12, which presses and fits the periphery section 12a into the concave section 7a in the vicinity of the rear corner section 8b, to slide and rotate to move to the lower end of the upper rear section 8e.

Subsequently, in step SP7, as illustrated in FIG. 10(g), the slide rail 30 is extended to reach a predetermined length. Then, in order to sequentially push the run channel 7 from the upper portion of the lower front section 8f in the vicinity of the upper front section 8d, the first robot arm 1 causes the lower-sash roller 14, which presses and fits the periphery section 14a into the concave section 7a in the vicinity of the upper front section 8d, to slide and rotate to move to the lower end of the lower front section 8f.

At that occasion, as illustrated in FIG. 8(a), the slide rail 30 with the lower-sash roller 14 installed in the tip presses the lower-sash roller 14 to the run channel 7 at a predetermined angle α to the perpendicular direction. And, as illustrated in FIGS. 8(b) and 8(c), the lower-sash roller 14 is caused to play back the teaching trace TL from the teaching point TP in the state where the lower-sash roller 14 is pressed to the run channel 7.

Then, as illustrated in FIGS. 8(d) and (e), the lower-sash roller 14 maintains the state of fitting into the concave groove 9 of the lower front section 8f through the run channel 7, carries out complicated operations and moves along a curve PL with deflection of the slide rail 30 and a reaction force from the lower front section 8f. As a result, the run channel 7 is smoothly fitted into the concave groove 9 in a substantially concave shape of the lower front section 8f.

On the other hand, as with the first robot arm 1, when the slide rail 30 is extended to reach a predetermined length, in order to sequentially push the run channel 7 from the upper section of the lower rear section 8g in the vicinity of the upper rear section 8e, the second robot arm 2 causes the lower-sash roller 14, which presses and inserts the periphery section 14a into the concave section 7a in the vicinity of the upper rear section 8e, to move in a complicated manner to the lower end of the lower rear section 8g.

At that occasion, the slide rail 30 with the lower-sash roller 14 installed in the tip presses the lower-sash roller 14 to the run channel 7 at a predetermined angle β to the perpendicular direction, which is intended to obtain similar operations and advantages to those in the case of the first robot arm 1.

When the run channel 7 is completely installed in the lower front section 8f and the lower rear section 8g, the first robot arm 1 and the second robot arm 2 respectively remove the lower-sash roller 14 from the gap 6c formed by the inner panel 6a and the outer panel 6b and come back to the original positions so as to finish the installation operation for installing the run channel 7 in the automobile door sash 8.

INDUSTRIAL APPLICABILITY

The present invention contributes to man-hour reduction of operations for installing a run channel for an automobile door being a long soft object on a sash of an automobile door. In addition, improvement and stabilization in quality of installation of a run channel for an automobile door can be achieved.

The invention claimed is:

1. An automobile run channel installing method for installing a run channel in a sash of an automobile door, comprising in order the steps of:
    setting a run channel to a conveyance means having only a pair of arms, the run channel having a concave section and only two corner sections;
    inserting the run channel from a gap formed by an inner panel and an outer panel into the automobile door with both end sections of the run channel directed downward and positioning the run channel along the sash;
    pushing both corner sections of the run channel into corner sections of an upper portion of the sash, respectively;
    pressing and fitting an upper-sash roller attached in at least one of the arms into the concave section of the run channel to move from the corner section of the upper sash so as to fit the run channel into the upper sash; and
    pressing and fitting a lower-sash roller into the concave section of the run channel to move from a higher portion to a lower portion of a lower portion of the sash and to fit the run channel into the lower sash, the lower-sash roller being attached to the arm and inserted into the automobile door from the gap.

2. A method of installing a run channel in a sash of an automobile door, comprising in order:
    setting a run channel to a conveyance device having only a pair of arms, the run channel having a concave section and only two corner sections;
    pushing both corner sections of the run channel into corner sections of an upper portion of the sash, respectively;
    pressing an upper-sash roller into the concave section of the run channel and moving the upper-sash roller inwardly and downwardly from the corner section of the upper sash to fit the run channel into the upper portion of the sash, the upper-sash roller being attached to at least one of the arms; and
    pressing a lower-sash roller into the concave section of the run channel and moving the lower-sash roller downwardly from a higher portion to a lower portion of a lower portion of the sash to fit the run channel into the lower portion of the sash, the lower-sash roller being attached to the arm.

3. The method of claim 2, wherein the method comprises:
    setting a first corner section of the run channel to a first arm and setting a second corner section of the run channel to a second arm;
    pushing the first corner section of the run channel into a first corner section of the upper portion of the sash and pushing the second corner section of the run channel into a second corner section of the upper portion of the sash;
    pressing first and second upper-sash rollers of the first and second arms into the concave section of the run channel, respectively, and moving the first and second upper-sash rollers inwardly and downwardly from the first and second corner sections of the upper sash to fit the run channel into the upper portion of the sash, respectively; and
    pressing first and second lower-sash rollers of the first and second arms into the concave section of the run channel, respectively, and moving the first and second lower-sash rollers downwardly from the higher portions to the lower portions of the lower portion of the sash to fit the run channel into the lower portion of the sash.

* * * * *